(12) United States Patent
Lin

(10) Patent No.: US 8,314,389 B2
(45) Date of Patent: Nov. 20, 2012

(54) MEASURING INSTRUMENT

(75) Inventor: Yu-An Lin, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 204 days.

(21) Appl. No.: 12/975,248

(22) Filed: Dec. 21, 2010

(65) Prior Publication Data

US 2012/0049744 A1 Mar. 1, 2012

(30) Foreign Application Priority Data

Aug. 25, 2010 (CN) .......................... 2010 1 0262488

(51) Int. Cl.
*G01J 5/00* (2006.01)
(52) U.S. Cl. .................................................. 250/338.1
(58) Field of Classification Search .... 250/338.1–338.5, 250/330–335, 336.1–336.2, 340, 341.1–341.8, 250/342–352
See application file for complete search history.

(56) References Cited

U.S. PATENT DOCUMENTS

| 5,567,052 A * | 10/1996 | Yoshiike et al. ............... 374/124 |
| 2011/0163233 A1 * | 7/2011 | Ng et al. ..................... 250/338.4 |
| 2012/0184827 A1 * | 7/2012 | Shwartz et al. ............... 600/302 |

* cited by examiner

*Primary Examiner* — Kiho Kim
(74) *Attorney, Agent, or Firm* — Altis Law Group, Inc.

(57) ABSTRACT

A measuring instrument includes a housing, a number of infrared light emitting devices, a number of infrared light receiving devices, at least two light sources, and a controller. The housing includes a first sidewall and a second sidewall substantially parallel to the first sidewall. The infrared light emitting devices are positioned on the first sidewall. The infrared light receiving devices are positioned on the second sidewall and receive infrared lights emitted by the infrared light emitting devices. The controller is electrically coupled to the infrared light receiving devices and the light sources. When one of the infrared light receiving devices does not receive infrared light emitted by a corresponding infrared light emitting device, the controller turns the light sources on.

10 Claims, 1 Drawing Sheet

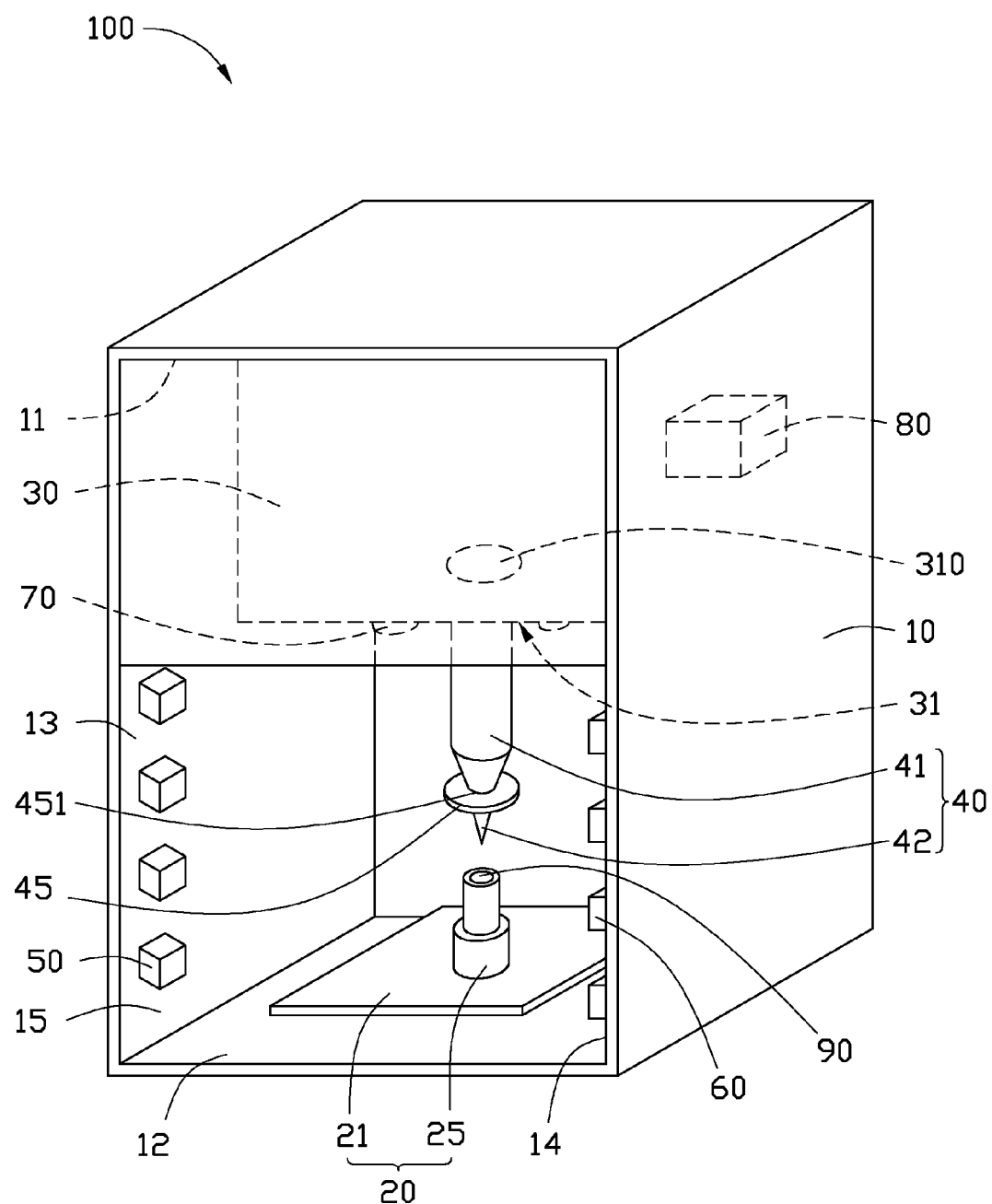

MEASURING INSTRUMENT

BACKGROUND

1. Technical Field

The disclosure relates to a measuring instrument.

2. Description of Related Art

Parameters of lenses are measured after the lenses were formed to ensure quality of the lenses. Such measurement is typically carried out in a black box in which a probe is installed. Sometimes, the lens under measurement may become misaligned from the probe and manual realignment is required. However, such realignment is difficult or inconvenient since the black box is too dark to clearly watch the lenses and the probe.

Therefore, it is desirable to provide a measuring instrument, which can overcome the above problems.

BRIEF DESCRIPTION OF THE DRAWING

Many aspects of the present disclosure can be better understood with reference to the drawing. The components in the drawing are not necessarily drawn to scale, the emphasis instead being placed upon clearly illustrating the principles of the present disclosure.

The drawing is a schematic view of a measuring instrument, according to an exemplary embodiment.

DETAILED DESCRIPTION

Embodiments of the present disclosure will now be described in detail below and with reference to the drawing.

Referring to the drawing, a measuring instrument 100, according to an exemplary embodiment, is configured for measuring optical parameters of lenses and includes a housing 10, a supporting member 20, a box 30, a scanning probe 40, four infrared light emitting devices 50, four infrared light receiving devices 60, two light sources 70, and a controller 80.

The housing 10 is generally cuboid and includes a ceiling 11, a floor 12, a first sidewall 13, and a second sidewall 14 substantially parallel to the first sidewall 13. Both the first sidewall 13 and the second sidewall 14 are perpendicularly connected between the ceiling 11 and the floor 12. The housing 10 also defines an operating window 15 between the first sidewall 13 and the second sidewall 14.

The supporting member 20 is generally positioned on the center of the floor 12 and includes a bottom plate 21 and a receiving member 25 for receiving a workpiece 90. In this embodiment, the workpiece 90 is a lens.

The box 30 is received in the housing 10 and suspended to the ceiling 11. The box 30 includes a first surface 31 opposing the supporting member 20. The box 30 defines a through hole 310 in the first surface 31, generally at the center thereof.

The scanning probe 40 includes a receiving column 41 and a probe 42 coaxially extending out from an end of the receiving column 41. The scanning probe 40 is partially received in the box 30. In particular, another end of the receiving column 41 opposite to the probe 42 extends through the through hole 310. The receiving column 41 can be lifted or lowered with respect to the supporting member 20 by a driver (not shown) received in the box 30, as such, the probe 42 can be lifted or lowered in the housing 10.

In this embodiment, the measuring instrument 100 further includes a Fresnel lens 45. The Fresnel lens 45 defines a circular opening 451 generally at the center thereof. The Fresnel lens 45 is coiled around to one end of the receiving column 41 adjacent to the probe 42 through the circular opening 451.

The four infrared light emitting devices 50 are respectively disposed on the first sidewall 13 and close to the operating window 15, and each of the infrared light emitting devices 50 emits a beam of infrared light. In this embodiment, the distance between two adjacent infrared light emitting devices 50 is less than 3 centimeters (cm) which is typically less than the thickness of the operator's hand. In particular, the distance between the lowest infrared light emitting device 50 and the floor 11 is less than 3 cm and the distance between the highest infrared light emitting device 50 and the box 30 is also less than 3 cm.

The four infrared light receiving devices 60 are respectively disposed on the second sidewall 14 and also close to the operating window 15, and each of the infrared light receiving devices 60 is aligned with a corresponding infrared light emitting device 50 and receives the infrared lights emitted by the corresponding infrared light emitting device 50.

The two light sources 70 are positioned on the first surface 31 of the box 30. In this embodiment, both the two light sources 70 are light emitting diodes (LEDs), which is symmetrical about the receiving column 41.

The controller 80 is received in the box 30 and is electrically coupled to the infrared light receiving devices 60 and the two light sources 70. The controller 80 is configured for monitoring whether or not the infrared light receiving devices 60 receive the beam of infrared light emitted by the corresponding infrared light emitting device 50. When at least one of the four infrared light receiving devices 60 does not receive the beam of infrared light emitted by the corresponding infrared light emitting device50, the controller 80 can control the two light sources 70 to illuminate.

In use, when an operator wants to manually adjust the position of the workpiece 90 through the operating window 15, the hand of the operator will block at least one infrared light receiving device 60 from receiving infrared light emitted by the corresponding infrared light emitting device 50. As such, the controller 80 controls the two light sources 70 to illuminate. In this embodiment, the Fresnel lens 45 is positioned between the light sources 70 and the workpiece 90, and gathers light emitted by the light sources 70 and focuses the light emitted by the light sources 70 on the workpiece 90. Therefore, it can further strengthen of the brightness of the light sources 70 on the workpiece 90, which is convenient to align the scanning probe 40 with the workpiece 90.

It should be noted that the number of the group of the infrared light emitting devices 50 or the infrared light receiving devices 60 are not limited to four, but can be any number depending on requirements, for example, the height of the operating window 15, as long as the distance between two adjacent infrared light emitting devices 50 is less than the thickness of a hand of an operator. For example, it also can be only two, if the height of the operating window 15 is less than three times of the thickness of the hand of the operator, or more than four, if the height of the operating window 15 is larger than five times of the thickness of the hand of the operator. It should be also noted that the number of the group of the LEDs 70 is not limited to two, but can be any number depending on requirements. For example, it can be three or more than four, which are disposed around the receiving column 41 of the scanning probe 40 and symmetrical about the receiving column 41, to further enhance the brightness around the workpiece 90.

As compared to typical measuring instruments, the measuring instrument 100 is capable of providing illumination in a situation that the operator needs to manually adjust the position of the workpiece 90. As a result, the measuring instrument 100 can prevent the scanning probe 40 from damage by the operator, during the process of the adjustment.

It is understood that the above-described embodiment are intended to illustrate rather than limit the disclosure. Variations may be made to the embodiment without departing from the spirit of the disclosure. Accordingly, it is appropriate that the appended claims be construed broadly and in a manner consistent with the scope of the disclosure.

What is claimed is:

1. A measuring instrument for measuring a workpiece, comprising:
   a housing comprising a ceiling, a floor, a first sidewall, a second sidewall substantially parallel to the first sidewall, the first and second sidewalls connecting the ceiling and the floor, and an operating window defined between the first sidewall and the second sidewall;
   a box received in the housing and suspended to the ceiling, the box comprising a first surface opposing the floor;
   a supporting member positioned on the floor and configured for supporting the workpiece;
   a scanning probe partially received in the box and opposing the supporting member;
   a plurality of infrared light emitting devices positioned on the first sidewall close to the operating window;
   a plurality of infrared light receiving devices positioned on the second sidewall, each of the infrared light receiving devices aligned with a corresponding infrared light emitting device, and configured for receiving infrared lights emitted by the corresponding infrared light emitting device;
   at least two light sources positioned on the first surface of the box; and
   a controller electrically coupled to the infrared light receiving devices and the at least two light sources, wherein when one of the infrared light receiving devices does not receive infrared lights emitted by the corresponding infrared light emitting device, the controller turns the at least two light sources on.

2. The measuring instrument of claim 1, wherein both the first sidewall and the second sidewall are perpendicularly connected between the ceiling and the floor.

3. The measuring instrument of claim 1, wherein the supporting member is generally positioned on the center of the floor and comprises a bottom plate and a receiving member for receiving the workpiece therein.

4. The measuring instrument of claim 3, wherein the first surface of the box defines a through hole, the scanning probe comprises a receiving column and a probe coaxially extending out from an end of the receiving column, the scanning probe is partially received in the box, another end of the receiving column opposite to the probe extends through the through hole.

5. The measuring instrument of claim 4, wherein the light sources are positioned symmetrical about the receiving column.

6. The measuring instrument of claim 1, wherein the workpiece is a lens.

7. The measuring instrument of claim 1, wherein the distance between two adjacent infrared light emitting devices is less than 3 centimeters.

8. The measuring instrument of claim 1, further comprising a Fresnel lens, wherein the Fresnel lens is positioned between the at least two light sources and the workpiece.

9. The measuring instrument of claim 8, wherein the Fresnel lens defines a circular opening generally on the center thereof, the Fresnel lens is coiled around to one end of the receiving column close to the probe via the circular opening.

10. The measuring instrument of claim 1, wherein the light sources are light emitting diodes.

* * * * *